UNITED STATES PATENT OFFICE.

MAX BLUMRICH, OF PHILADELPHIA, PENNSYLVANIA, ASSIGNOR OF ONE-HALF TO HENRY STOCKMAN, OF SAME PLACE.

OPERATION OF MOTIVE-POWER APPARATUS.

SPECIFICATION forming part of Letters Patent No. 374,926, dated December 20, 1887.

Application filed September 7, 1886. Serial No. 212,908. (No specimens.)

*To all whom it may concern:*

Be it known that I, MAX BLUMRICH, a citizen of the United States, residing at Philadelphia, Pennsylvania, have invented an Improvement in the Operation of Motive-Power Apparatus, of which the following is a specification.

My invention relates to the practical utilization of bisulphide of carbon as a motive-power fluid. One of the principal practical objections to the use of this fluid has been the liability to explosion, if through any means a portion of it becomes exposed to the atmosphere. Owing to its inflammability on exposure to the air, the use of this substance is therefore attended with considerable danger. I meet this objection by combining with the bisulphide of carbon a substance which will have the effect of destroying its liability to become inflammable on exposure to the atmosphere, while at the same time not interfering with its volatile and expansive properties.

The substance which I prefer to use with the bisulphide of carbon for the purpose named is paraffine; but I do not limit myself to the use of this particular soluble solid hydrocarbon.

I have found by practice that paraffine when mixed with bisulphide of carbon, as described, quickly becomes dissolved and has the effect of destroying the inflammability of the bisulphide, while not detracting from its volatile properties.

I claim as my invention—

1. The mode herein described of operating motive-power apparatus with bisulphide of carbon, said mode consisting in mixing with the bisulphide a soluble solid hydrocarbon, which destroys its inflammability while not interfering with its volatile properties.

2. The mode herein described of operating motive-power apparatus with bisulphide of carbon, said mode consisting in mixing paraffine with the bisulphide, as and for the purpose set forth.

In testimony whereof I have signed my name to this specification in the presence of two subscribing witnesses.

M. BLUMRICH.

Witnesses:
WILLIAM D. CONNER,
HUBERT HOWSON.